United States Patent
Kinoshita et al.

[11] Patent Number: 5,857,703
[45] Date of Patent: Jan. 12, 1999

[54] STEERING COLUMN ASSEMBLY FOR VEHICLE

[75] Inventors: Satoshi Kinoshita; Yota Uesaka, both of Aichi, Japan

[73] Assignee: Fuji Kiko Co., Ltd., Tokyo, Japan

[21] Appl. No.: 873,950

[22] Filed: Jun. 12, 1997

[30] Foreign Application Priority Data

Jul. 2, 1996 [JP] Japan .................................. 8-171932

[51] Int. Cl.⁶ ...................................................... B62D 1/18
[52] U.S. Cl. .............................. 280/775; 280/777; 74/493
[58] Field of Search .................................... 280/775, 777; 74/492, 493

[56] References Cited

U.S. PATENT DOCUMENTS

| 5,117,707 | 6/1992 | Kinoshita et al. | 74/493 |
| 5,287,763 | 2/1994 | Nagashima | 74/493 |
| 5,722,299 | 3/1998 | Yamamoto et al. | 74/493 |

FOREIGN PATENT DOCUMENTS

| 4-51088 | 12/1992 | Japan . |
| 6-42522 | 6/1994 | Japan . |
| 7-10670 | 2/1995 | Japan . |

*Primary Examiner*—Paul N. Dickson
*Attorney, Agent, or Firm*—Foley & Lardner

[57] ABSTRACT

A steering column assembly has a column support member for supporting a steering column, a mounting bracket fixed to a vehicle body and formed with elongate holes for tilt adjustment, a clamping bolt passing through the elongate holes and bolt holes of the column support member, and a manual tilt lever. The assembly further includes a first stopper member mounted on a first end of the bolt for limiting a rotation of the tilt lever, and a second stopper member mounted on a second end of the bolt for preventing a rotation of the bolt. The column support member has engaging arms projecting rearwards, and the first and second stopper members have engaging arms projecting rearwards and engaging with the arm ends of the column support member on the rear side of the mounting bracket, respectively, so as to prevent the tilt lever from rotating downwards in a secondary collision.

13 Claims, 4 Drawing Sheets

STEERING COLUMN ASSEMBLY FOR VEHICLE

BACKGROUND OF THE INVENTION

The present invention relates to a steering column assembly for a vehicle, and more specifically to a steering column assembly including a mounting bracket designed to absorb impact energy in a secondary collision.

In a secondary collision of the driver against the steering wheel, a load is applied on the steering column in the axial direction. In a bending type impact absorbing structure, a mounting bracket is bent forwards toward the front of the vehicle by this axial load.

FIGS. 5~7 show one conventional bending type impact absorbing steering column assembly. A mounting bracket 1 has left and right horizontal upper walls 2 to be fixed to the vehicle body, left and right bent portions 3, left and right vertical front walls 4 and left and right vertical side walls 5 formed with elongate holes 9. An approximately U-shaped column support member (or distance bracket) 7 is clamped between the left and right side walls 5 of the mounting bracket 1. A steering column 8 is fixedly supported on the column support member 7.

A clamping bolt 10 passes through the elongate holes 9 of the mounting bracket and holes of the column support member 7. A nut 16 fixed to a tilt lever 13 is screwed on a threaded end of the clamping bolt 10.

The steering column assembly of FIGS. 5, 6 and 7 further includes rotation preventing member 11 and sliding contact plate 12 both mounted on the clamping bolt 10 on opposite sides of the mounting bracket 1. The rotation preventing member 11 is received and engaged in the elongate hole 9 on the right side as viewed in FIG. 7. The rotation preventing member 11 is movable up and down in the right side elongate hole 9. The sliding contact plate 12 is received and engaged in the elongate hole 9 on the left side, and mounted on the clamping bolt 10 between the nut 16 of the tilt lever 13 and the side wall 5 on the left side. The sliding contact plate 12 has a projection 15 for limiting a rotational movement of the tilt lever 13. The sliding contact plate 12 has side surfaces producing frictional forces with the side wall 5 of the mounting bracket 1 and the nut 16, and improves the holding or fastening force with the frictional forces.

In the state in which an arm of the tilt lever 13 is pulled up to an uppermost position, and a projection 14 of the tilt lever 13 abuts on the projection 15 of the sliding contact plate 12, the nut 16 integral with the tilt lever 13 is tightened on the clamping bolt 10, the column support member 7 is clamped between the left and right side walls 5 of the mounting bracket 1, and this steering column assembly firmly holds the steering column 8 at a desired position with the frictional forces. By rotating the arm of the tilt lever 13, the driver can remove the clamping force of the clamping bolt 10, and adjust the steering column 8 up and down along the elongate holes 9 of the mounting bracket 1.

The tilt lever 13 is normally kept unobstructive above the knees of the driver. In a head-on collision of the vehicle, the driver collides against the steering wheel, and a force F is applied on the steering column 8 in the axial direction. By this force, the steering column 8 is shoved forwards along the axial direction, and the mounting bracket 1 is deformed so that the front walls 4 swing forward about the bent portions 3, and the angle between the front walls 4 and the upper wall 2 becomes greater. With this deformation, the clamping bolt 10 moves together with the side walls 5 through the stopper 11 engaging with the right side elongate hole 9. At the same time, the projection 15 of the plate 12 in engagement with the left side elongate hole 9 pushes the tilt lever 13, and the tilt lever 13 is rotated downward as shown by an arrow R in FIG. 8 to a lower position shown by two dot chain lines. At the lower position, the tilt lever 13 projects toward the driver's knees.

SUMMARY OF THE INVENTION

It is therefore an object of the present invention to provide a steering column assembly designed to prevent a tilt lever from being forced to an obstructive position in a secondary collision.

According to the present invention, a steering column assembly for a vehicle comprises a steering column, a column support member (or distance bracket), a mounting bracket, a clamping bolt and at least one stopper member.

The column support member supports the steering column. The column support member is formed with at least one bolt hole. The mounting bracket supports the steering column and the column support member. The mounting bracket is formed with at least one elongate hole for allowing the column support member to move up and down to adjust a position of the steering column. The clamping bolt passes through the bolt hole of the column support member and the elongate hole of the mounting bracket. The stopper member is mounted on the clamping bolt.

In this steering column assembly, the column support member comprises at least one inner engaging portion, and the stopper member comprises an outer engaging portion engaging with the inner engaging portion of the column support member.

In a secondary collision, the stopper member remains in the normal posture without rotation because of the engagement with the column support member, and does not cause an undesired rotation of the tilt lever to an obstructive position.

Preferably, the outer and inner engaging portions extend in the rearward direction toward the rear of the vehicle, and project beyond the mounting bracket, and the outer and inner engaging portions are engaged with each other on the rear side of the mounting bracket.

The mounting bracket may comprise at least one outer side wall that extends from a front wall end to a rear wall end along the steering column, and that is formed with the elongate hole. The outer side wall of the mounting bracket is located between the stopper member and the column support member. The outer and inner engaging portions extend in the rearward direction away from the clamping bolt along the outer side wall on both sides, and project beyond the rear wall end of the outer side wall of the mounting bracket. The outer and inner engaging portions engage with each other on the rear side of the first side wall of the mounting bracket.

DETAILED DESCRIPTION OF THE INVENTION

FIGS. 1~4 show a steering column assembly according to one embodiment of the present invention.

Figure 1:
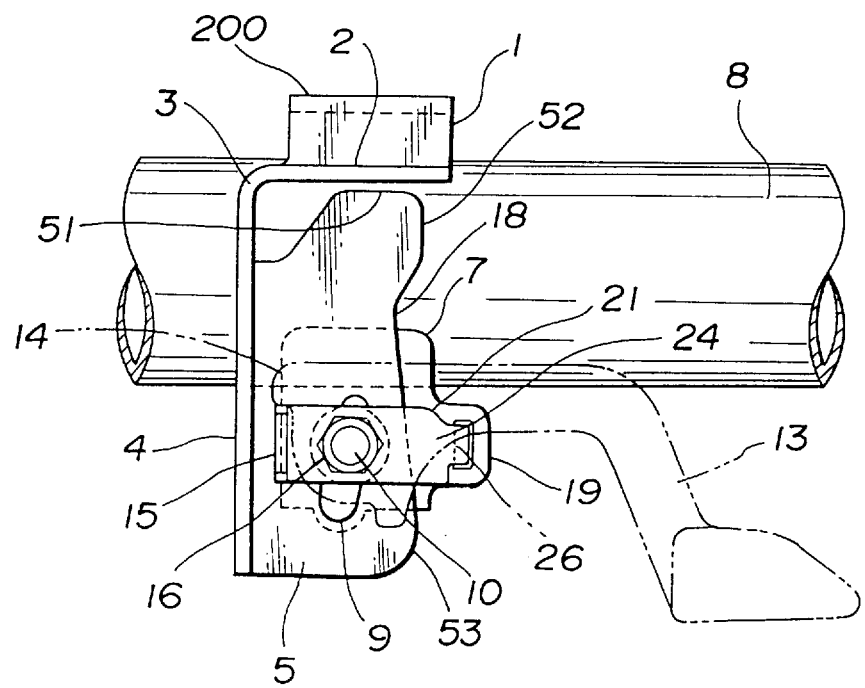
FIG. 1 is a front view of a steering column assembly according to one embodiment of the present invention.
Figure 2:
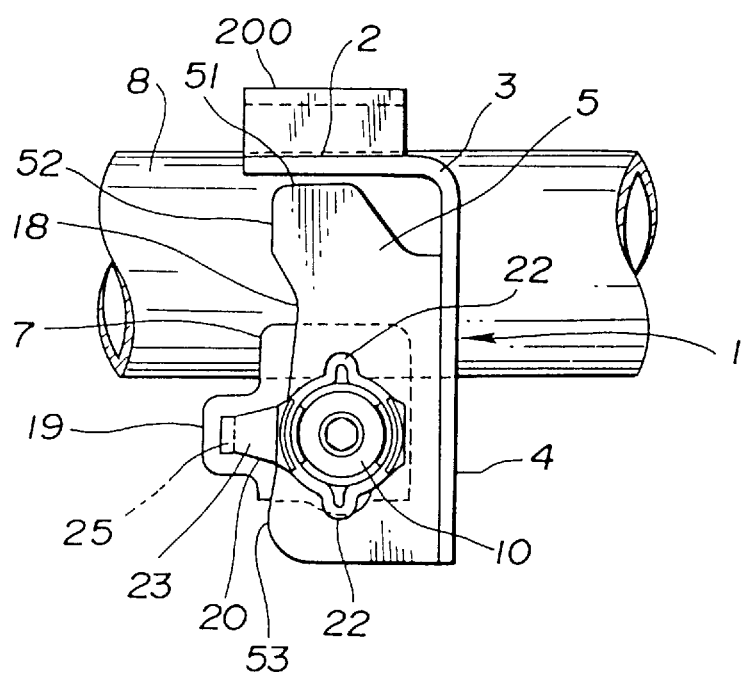
FIG. 2 is a rear view of the steering column assembly of FIG. 1.
Figure 3:
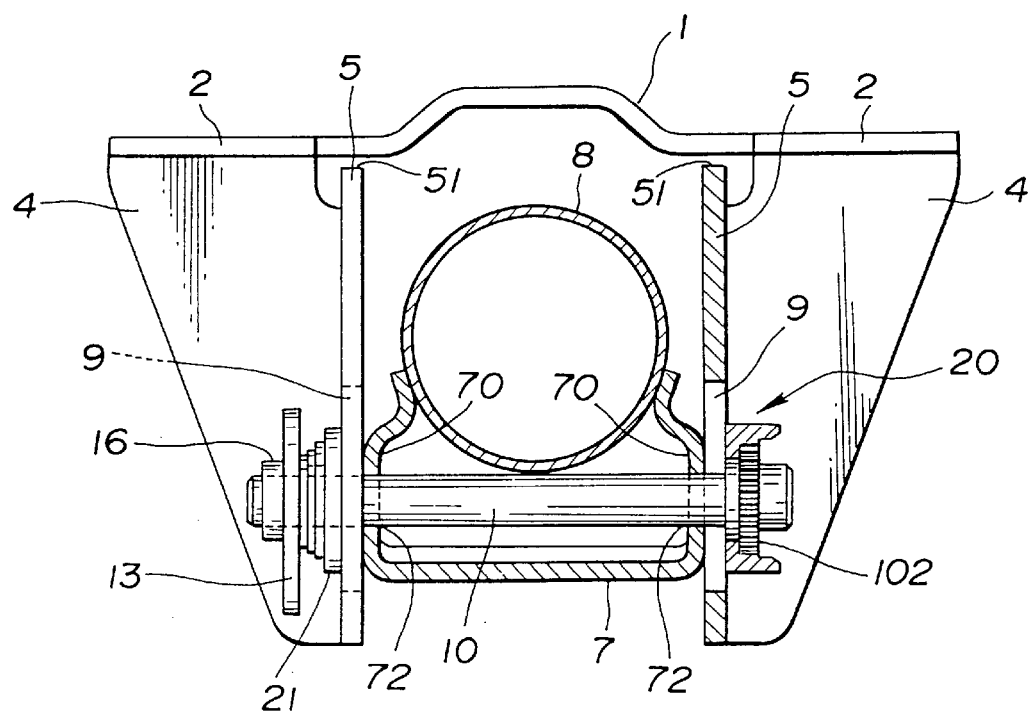
FIG. 3 is a partly sectional right side view of the steering column assembly of FIG. 1.

A mounting or fixing bracket 1 shown in FIGS. 1~3 has a middle bridge 200 and first and second (or left and right) wings (2, 3, 4 and 5). The middle bridge and wings are all integral part of a shaped plate. The middle bridge 200 is an approximately horizontal plate-like portion located between the first and second wings. As best shown in FIG. 3, a steering column 8 is placed between the first and second wings under the middle bridge 200.

Each wing includes an upper wall 2, a bent portion 3, a front wall 4 and a side wall 5. Each wall is a plate section of the shaped plate. The upper wall 2 is approximately horizontal and adapted to be fixed to a vehicle body. The front wall 4 extends downwards. The bent portion 3 is bent between the horizontal upper wall 2 and the vertical front wall 4. The bent portion 3 extends from the front end of the upper wall 2 to the upper end of the vertical wall 4. In this example, the bent portion 3 is so bent as to form a right angle between the horizontal upper wall 2 and the vertical front wall 4. The vertical front wall 4 of this example is a flat plate-like portion, and extends in a plane to which the axis of the steering column 8 is perpendicular. The side wall 5 is a flat plate-like portion extending backwards from an inner end of the front wall 4 along the axial direction of the steering column 8. The side wall 5 of this example is parallel to the axis of the steering column 8. The angle between the front wall 4 and the side wall 5 is equal to 90°, in this example. The upper end 51 of the side wall 5 is spaced from the downwardly facing surface of the upper wall 2 so that there is formed a predetermined clearance therebetween.

A column support member (or distance bracket) 7 supports the steering column 8. The steering column 8 is mounted and fixed on the column support member 7. The column support member 7 is placed between the left and right side walls 5 of the mounting bracket 1. The left and right side walls 5 are flat and parallel to each other. The parallel side walls 5 confront each other. The column support member 7 is approximately U-shaped, and has first and second (or left and right) flat upright side walls 70. The first side wall 70 of the column support member 7 is adapted to abut against the inside wall surface of the first side wall 5 from the inside. Similarly, the second side wall 70 of the column support member 7 can abut against the inside surface of the second side wall 5 of the mounting bracket 1. On each of the left and right sides, the side wall 5 of the mounting bracket 1 is an outer wall located outside the side wall 70 of the column support member 7, and the side wall 70 of the column support member 7 is an inner wall located inside the side wall 5 of the mounting bracket 1.

A clamping bolt 10 connects the mounting bracket 1 and the column support member 7. An elongate hole 9 is formed in each of the outer side walls 5 of the mounting bracket 1. A hole, such as a bolt hole, 72 is formed in each inner side wall 70 of the column support member 7. The clamping bolt 10 passes through the elongate holes 9 of the mounting bracket 1 and the holes 72 of the column support member 7. The clamping bolt 10 has a first end portion and a second end portion.

A tilt lever 13 is mounted on the first end portion of the clamping bolt. The first end portion of the clamping bolt 10 is threaded, and a nut 16 is screwed on the threaded first end portion of the clamping bolt 10. The tilt lever 13 has a fulcrum portion and a lever arm extending rearwards from the fulcrum portion. The nut 16 is fixed to the fulcrum portion of the tilt lever 13. The fulcrum portion of the tilt lever 13 has a front projection 14. The fulcrum portion of the tilt lever 13 further has a lower projection projecting downward as shown in FIG. 1.

The mounting bracket 1 according to this embodiment of the invention has first and second (or left and right) recesses 18 formed, respectively, in the first and second side walls 5. On each of the left and right sides, the side wall 5 extends from the inner end of the front wall 4 in the rearward direction to a rear wall end. The rear wall end of each side wall 5 comprises an upper end segment 52 and a lower end segment 53. The recess 18 on each side is recessed or depressed between the upper and lower end segments 52 and 53 toward the front wall 4. Therefore, the rear wall end of each side wall 5 of this example is not straight but concave.

The column support member 7 according to this embodiment of the invention has first and second engaging portions 19 projecting rearwards from the rear ends of the first and second (left and right) side walls 70. In this example, each of the first and second engaging portions 19 is in the form of an engaging arm.

A rotation stopper member 20 is mounted on the second end portion of the clamping bolt 10. The stopper member 20 is designed to prevent the rotation of the clamping bolt 10. The parallel side walls 5 of the mounting bracket 1 and the column support member 7 are located between the tilt lever 13 and the stopper member 20 along the axial direction of the clamping bolt 10.

Another stopper member 21 which, in this example, is a stopper plate (or sliding contact plate) is mounted on the first end portion of the clamping bolt 10. The stopper member 21 is located between the tilt lever 13 and the first side wall 5 of the mounting bracket 1. The fulcrum portion of the tilt lever 13 abuts on the stopper plate 21. The stopper plate 21 has a stopper portion 15 which, in this example, is in the form of a projection.

When the arm of the tilt lever 13 is lifted up, the column support member 7 is clamped between the parallel side walls 5 of the mounting bracket 1 by the nut 16 of the clamping lever 13. At an uppermost position of the tilt lever 13, the front projection 14 of the tilt lever 13 abuts against the stopper projection 15 from above, and thereby prevents a further rotation of the tilt lever 13 about the clamping bolt 10 in a counterclockwise direction as viewed in FIG. 1. In this state, the steering column assembly fixes the position of the steering column 8 with the frictional forces due to the side walls 5 tightening the column support member 7 therebetween. The stopper plate 21 between the nut 16 and the left side wall 5 of the mounting bracket 1 further increases the frictional forces.

The lower projection of the tilt lever 13, on the other hand, abuts against the stopper projection 15 from below when the tilt lever 13 is lowered to a lowermost position.

The rotation-preventive stopper member 20 of this example is an elastic or flexible member of an annular shape, and has an inside cylindrical surface. In this example, the inside cylindrical surface of the stopper member is serrated. The clamping bolt 10 of this example has an outward flange 102 having a serrated outside cylindrical surface, at the second bolt end portion. The serrated flange 102 of the clamping bolt 10 is received in the annular stopper member 20. The internal serrations of the rotation preventing stopper member 20 are in engagement with the external serrations of the outward flange 102 of the clamping bolt 10. The stopper member 20 of this example has a pair of lobes 22 for producing a tightening force. The two lobes 22 project outwards in two opposite radial outward directions. The stopper member 20 is engaged with a stepped portion formed in the flange 102 so that the stopper member 20 cannot be extracted.

The stopper member 20 abuts on the outside surface of the adjacent second side wall section 5 of the mounting bracket 1. However, the stopper member 20 is not engaged with the elongate hole 9 of the second side wall section 5.

The stopper member 20 is formed with an engaging portion 23 projecting rearwards. In this example, the engaging portion 23 is in the form of an engaging arm. The engaging arm 23 extends along the right side engaging arm 19 of the column support member 7, and has a hooked arm end. The hooked arm end is angled inwards toward the right side engaging arm 19 of the column support member 7, and received in an engaging hole 25 formed in the arm end of the engaging arm 19 of the column support member 7.

In this embodiment, it is possible to employ a rotation preventing structure of an other type instead of the serrated structure.

The stopper plate 21 has an engaging portion 24 which, in this example, is in the form of an arm similar to the arm 23 of the stopper member 20 on the second side. The engaging arm 24 of the stopper plate 21 extends along the left side engaging arm 19 of the column support member 7, and has a hooked arm end. The hooked arm end is angled inwards toward the left side arm 19 of the column support member 7, and received in an engaging hole 26 formed in the arm end of the left side arm 19 of the column support member 7.

Thus, both of the stopper members 20 and 21 engage with the column support member 7. Both stopper members 20 and 21 are out of engagement with the elongate holes 9.

When the driver rotates the lever arm of the tilt lever 13 downwards to loosen the nut 16 on the clamping bolt 10, the column support member 7 becomes movable up and down between the side wall sections 5 of the mounting bracket 1 with the clamping bolt 10 movable up and down along the elongate holes 9. At a desired position, the driver can fix the steering column 8 by lifting up the lever arm of the tilt lever 13.

Figure 4:
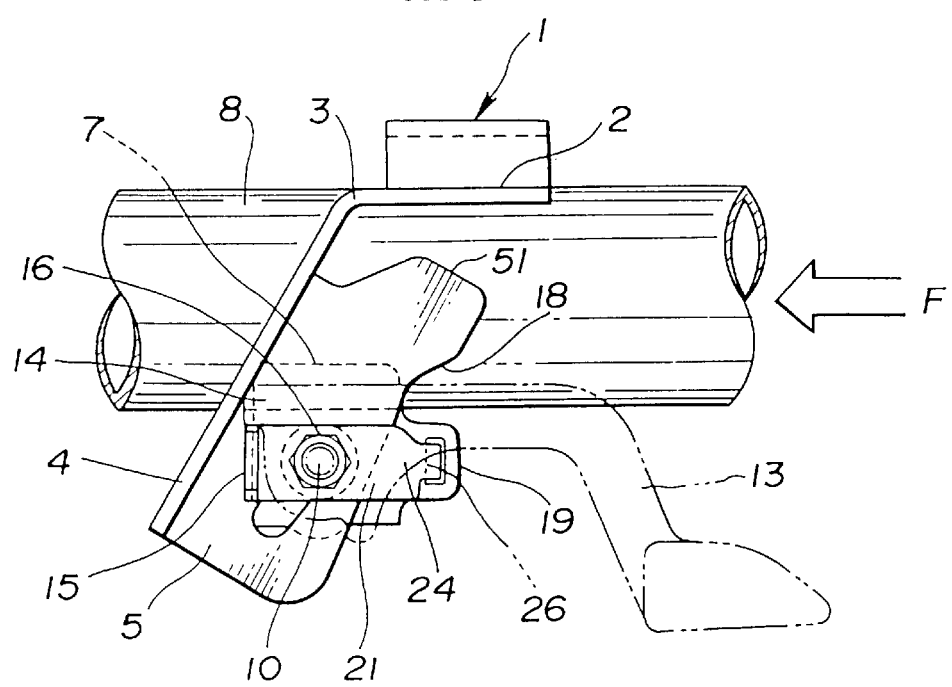
FIG. 4 is a front view of the steering column assembly of FIG. 1 in a deformed state.
Figure 5:
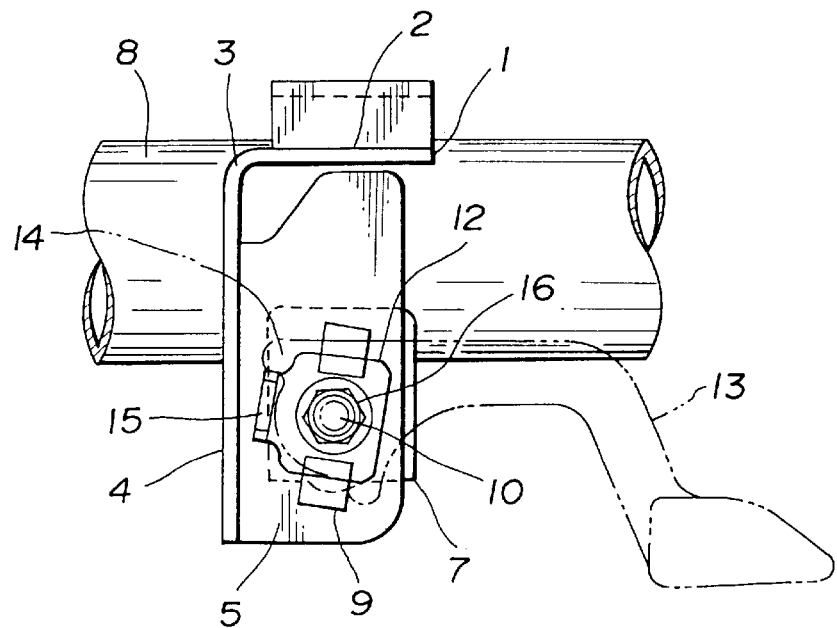
FIG. 5 is a front view showing a conventional steering column assembly.
Figure 6:
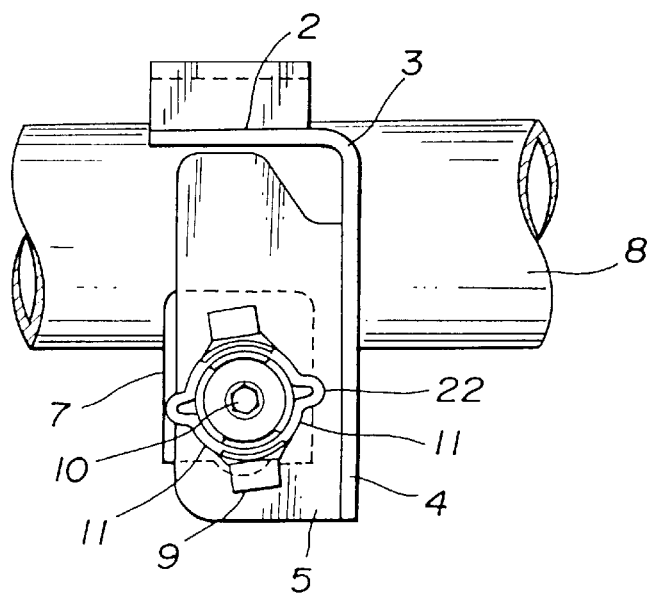
FIG. 6 is a rear view of the conventional steering column assembly of FIG. 5.
Figure 7:
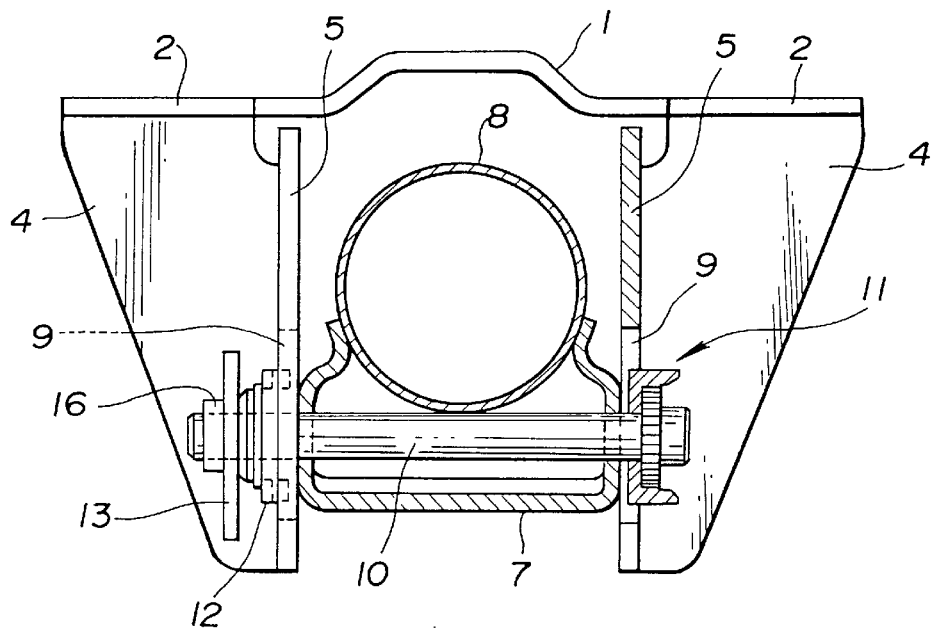
FIG. 7 is a partly sectional right side view of the conventional steering column assembly of FIG. 5.
Figure 8:
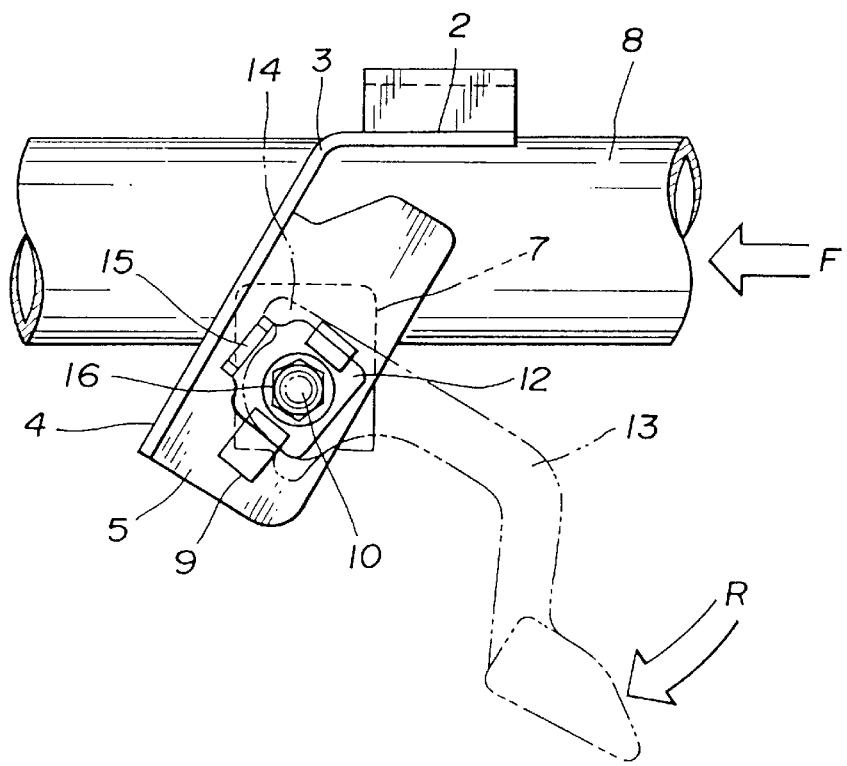
FIG. 8 is a front view showing the conventional steering column assembly of FIG. 5 in a deformed state.

In a second stage (secondary collision) of a vehicle's collision, the driver collides with the steering wheel, and the steering column 8 receives an impact force F in the axial direction as shown in FIG. 4. By this force, the mounting bracket 1 is deformed in such a manner that the front walls 4 and the side walls 5 of the mounting bracket 1 swing forward toward the front of the vehicle about the position of the bent portions 3 and the angle between the upper walls 2 and the front wall 4 becomes greater. However, the tilt lever 13 remains in the upper most position without rotating with the side wall sections 5 of the mounting bracket 1 because of the engagement of the stopper members 20 and 21 with the arms 19 of the column support member 7 fixed to the steering column 8. The side walls 5 formed with the recesses 18 can swing forwards without interfering with the arms 23 and 24 of the stopper members 20 and 21. However, it is possible to prevent the undesired interference between the arms 23 and 24 and the side wall sections 5 by increasing the lengths of the arms 23 and 24, instead of forming the recesses 18.

In this way, the stopper members 20 and 21 on both sides of the mounting bracket 1 are disconnected from the mounting bracket 1, and instead connected with the column support member 7, so that this steering column assembly can prevent the tilt lever 13 from rotating downwards in a secondary collision.

The present invention is not limited to the impact absorbing structure shown in the figures.

What is claimed is:

1. A steering column assembly for a vehicle, comprising:

a steering column;

a column support member for supporting the steering column, the column support member having a bolt hole;

a mounting bracket for supporting the steering column and the column support member, the mounting bracket having an elongate hole for allowing the column support member to move up and down to adjust a position of the steering column;

a clamping bolt passing through the bolt hole of the column support member and the elongate hole of the mounting bracket; and a first stopper member mounted on the clamping bolt;

wherein the column support member comprises a first inner engaging portion, and the first stopper member comprises a first outer engaging portion engaging with the first inner engaging portion of the column support member; and wherein the first outer and inner engaging portions extend in a rearward direction and project beyond the mounting bracket, and the first outer and inner engaging portions are engaged with each other on a rear side of the mounting bracket.

2. A steering column assembly according to claim 1, wherein the steering column assembly further comprises a tilt lever for clamping and releasing the column support member in the mounting bracket, and the tilt lever is mounted on the clamping bolt.

3. A steering column assembly according to claim 2, wherein the mounting bracket comprises an impact absorbing portion for deforming to absorb impact energy in a secondary collision; and wherein the first stopper member comprises a stopper portion for limiting a rotational movement of one of the clamping bolt and the tilt lever.

4. A steering column assembly according to claim 3, wherein the steering column assembly further comprises a second stopper member mounted on the clamping bolt, the mounting bracket being placed between the first and second stopper members, the first stopper member being placed between the tilt lever and the mounting bracket; and wherein the column support member comprises a second inner engaging portion, the second stopper member comprises a second outer engaging portion engaging with the second inner engaging portion of the column support member, the second outer and inner engaging portions extend in the rearward direction and project beyond the mounting bracket, and the second outer and inner engaging portions are engaged with each other on the rear side of the mounting bracket.

5. A steering column assembly according to claim 4, wherein the mounting bracket comprises first and second outer side walls each extending in the rearward direction along the steering column to a rear wall end, the column support member is placed between the first and second outer side walls, the elongate hole is formed in each of the first and second outer side walls of the mounting bracket, the first outer side wall of the mounting bracket is located between the first stopper member and the column support member, the first outer and inner engaging portions extend in the rearward direction away from the clamping bolt beyond the rear wall end of the first side wall of the mounting bracket, the first outer and inner engaging portions of the first stopper member and the column support member engage with each other on the rear side of the first side wall of the mounting bracket, the second outer side wall of the mounting bracket is located between the second stopper member and the column support member, the second outer and inner engaging portions extend in the rearward direction away from the clamping bolt beyond the rear wall end of the second side wall of the mounting bracket, and the second outer and inner engaging portions of the second stopper member and the column support member engage with each other on the rear side of the second side wall of the mounting bracket.

6. A steering column assembly according to claim 5, wherein one of the first inner engaging portion of the column support member and the first outer engaging portion of the first stopper member comprises a first engaging hole and the other of the first inner and outer engaging portions comprises a first hooked end received in the first engaging hole of one of the first inner and outer engaging portions, one of the second inner engaging portion of the column support member and the second outer engaging portion of the second stopper member comprises a second engaging hole and the other of the second inner and outer engaging portions comprises a second hooked end received in the second engaging hole of one of the second inner and outer engaging portions.

7. A steering column assembly according to claim 5, wherein the first stopper member is mounted on the clamping bolt between the tilt lever and the first outer side wall, the first outer side wall is placed between the first stopper member and the column support member, the second outer side wall is placed between the second stopper member and the column support member, the first stopper member comprises a stopper portion for limiting a rotational movement of the tile lever, and the second stopper member comprises a stopper portion for preventing a rotational movement of the clamping bolt.

8. A steering column assembly according to claim 7, wherein the mounting bracket comprise first and second upper walls for being fixed to a vehicle body, first and second front walls extending downwards, respectively under the first and second upper walls, the first and second outer side walls extending, respectively, from the first and second front walls in the rearward direction along the steering column, the first outer side wall comprises an upper end extending along the first upper wall with a clearance between the first upper wall and the upper end of the first outer side wall, and the second outer side wall comprises an upper end extending along the second upper wall with a clearance between the second upper wall and the upper end of the second outer side wall.

9. A steering column assembly according to claim 8, wherein the first outer side wall comprises an upper rear end segment, a lower rear end segment and a middle rear end segment recessed toward the first front wall between the upper and lower rear end segments of the first side wall, and the second outer side wall comprises an upper rear end segment, a lower rear end segment and a middle rear end segment recessed toward the second front wall between the upper and lower rear end segments of the second side wall.

10. A steering column assembly according to claim 9, wherein the column support member comprises a first inner side wall for abutting on the first outer side wall of the mounting bracket, and a second inner side wall for abutting on the second outer side wall of the mounting bracket, the bolt hole of the column support member is formed in each of the first and second inner side walls, the first inner engaging portion projects from the first inner side wall in the rearward direction, and the second inner engaging portion projects from the second inner side wall in the rearward direction; and wherein the first inner engaging portion of the column support member comprises an engaging hole and the outer engaging portion of the first stopper member comprises a hooked end received in the engaging hole of the first inner engaging portion of the column support member, and the second inner engaging portion of the column support member comprises an engaging hole and the outer engaging portion of the second stopper member comprises a hooked end received in the engaging hole of the second inner engaging portion of the column support member.

11. A steering column assembly according to claim 10, wherein the tilt lever comprises a lever arm extending in the rearward direction and a front projection for abutting, from above, against the stopper portion of the first stopper member, and the tilt lever further comprises a nut screwed on a threaded end of the clamping bolt.

12. A steering column assembly according to claim 11, wherein the impact absorbing portion of the mounting bracket comprises a first bent portion forming an angle between the first upper wall and the first front wall, and a second bent portion forming an angle between the second upper wall and the second front wall.

13. A steering column assembly according to claim 12, wherein the first outer side wall of the mounting bracket comprises an outside flat surface surrounding one of the elongate holes, and the first stopper member comprises an inside flat surface for abutting on the outside flat surface of the first outer side wall and preventing the first stopper member from engaging with the elongate hole in the first outer side wall, and the second outer side wall of the mounting bracket comprises an outside flat surface surrounding one of the elongate holes, and the second stopper member comprises an inside flat surface for abutting on the outside flat surface of the second outer side wall and preventing the second stopper member from engaging with the elongate hole in the second outer side wall.

* * * * *